United States Patent
Craw

(10) Patent No.: US 12,546,236 B2
(45) Date of Patent: Feb. 10, 2026

(54) PARALLEL HEAT RECOVERY IN GAS POWER GENERATION

(71) Applicant: Numerical Analysis Inc., Gainesville, FL (US)

(72) Inventor: Ian Alistair Craw, Gainesville, FL (US)

(73) Assignee: Numerical Analysis Inc., Gainesville, FL (US)

( * ) Notice: Subject to any disclaimer, the term of this patent is extended or adjusted under 35 U.S.C. 154(b) by 0 days.

(21) Appl. No.: 18/648,909

(22) Filed: Apr. 29, 2024

(65) Prior Publication Data

US 2025/0334061 A1    Oct. 30, 2025

(51) Int. Cl.
| | |
|---|---|
| F01K 21/04 | (2006.01) |
| F02C 6/10 | (2006.01) |
| F02C 6/18 | (2006.01) |
| F22B 1/18 | (2006.01) |

(52) U.S. Cl.
CPC ............. *F01K 21/047* (2013.01); *F02C 6/10* (2013.01); *F02C 6/18* (2013.01); *F22B 1/1815* (2013.01); *C01B 2203/0233* (2013.01)

(58) Field of Classification Search
CPC ...... F02C 6/10; F02C 6/18; F02C 9/40; F01K 21/047; F22B 1/1815; C01B 2203/0233; C01B 2203/0811; C01B 2203/0827; C01B 2203/0833
See application file for complete search history.

(56) References Cited

U.S. PATENT DOCUMENTS

| | | | |
|---|---|---|---|
| 5,628,183 A | 5/1997 | Rice | |
| 5,678,408 A | 10/1997 | Janes | |
| 5,896,738 A | 4/1999 | Yang et al. | |
| 6,338,239 B1 | 1/2002 | Hirata et al. | |
| 7,707,837 B2 * | 5/2010 | Inui ........................ | F02C 3/22 60/39.182 |
| 8,166,766 B2 * | 5/2012 | Draper .................... | F02C 6/00 60/39.52 |
| 8,359,868 B2 * | 1/2013 | Conchieri ................ | F02K 3/08 122/7 B |

(Continued)

FOREIGN PATENT DOCUMENTS

| | | | | |
|---|---|---|---|---|
| EP | 1655467 A1 | 5/2006 | | |
| EP | 2725207 A1 * | 4/2014 | ........... | F01K 17/025 |

*Primary Examiner* — Alain Chau
(74) *Attorney, Agent, or Firm* — Sean E. Combs, Esq.; GrayRobinson, P.A.

(57) ABSTRACT

A modified combined-cycle gas power system includes a mixed fuel preheat coil, a heat recovery steam generator (HRSG), and a parallel connection coupling a gas turbine to the mixed fuel preheat coil and the HRSG for receiving gas turbine exhaust (GTE). In some cases, the system further includes a GTE flow controller coupled to the parallel connection to control a ratio of the GTE received by the mixed fuel preheat coil and the HRSG. In some cases, the parallel connection from the gas turbine to the mixed fuel preheat coil and the HRSG is a single exhaust duct having an internal separator baffle. In some cases, the parallel connection from the gas turbine to the mixed fuel preheat coil and the HRSG is dual exhaust ducts. In some cases, the mixed fuel preheat coil does not include a burner or catalyst for generating reformed fuel.

20 Claims, 3 Drawing Sheets

(56) References Cited

U.S. PATENT DOCUMENTS

| | | | |
|---|---|---|---|
| 8,371,100 B2* | 2/2013 | Draper | F02C 6/00 60/39.5 |
| 8,409,307 B2 | 4/2013 | Drnevich et al. | |
| 8,674,532 B2 | 3/2014 | Wei et al. | |
| 9,163,827 B2* | 10/2015 | Wilson | F02C 6/18 |
| 9,964,003 B2* | 5/2018 | Benz | F02C 3/34 |
| 12,338,751 B2* | 6/2025 | Terwilliger | F01D 25/30 |
| 2005/0050894 A1* | 3/2005 | Ahmed | C01B 3/384 60/722 |
| 2005/0176831 A1* | 8/2005 | Inui | C01B 3/382 518/703 |
| 2006/0057059 A1* | 3/2006 | Nishida | C10G 31/08 422/198 |
| 2007/0283701 A1* | 12/2007 | Yokota | F02C 3/20 60/780 |
| 2008/0155984 A1 | 7/2008 | Liu et al. | |
| 2009/0117024 A1 | 5/2009 | Weedon et al. | |
| 2010/0242429 A1* | 9/2010 | Smith | F02C 7/10 60/39.182 |
| 2012/0073260 A1* | 3/2012 | Draper | F02C 1/06 60/39.5 |
| 2012/0131898 A1* | 5/2012 | Mokheimer | F02C 6/18 60/641.14 |
| 2012/0187688 A1* | 7/2012 | Draper | F02C 1/06 60/39.511 |
| 2013/0127163 A1 | 5/2013 | Palamara et al. | |
| 2015/0121892 A1* | 5/2015 | Benz | F02C 3/34 60/645 |
| 2015/0128608 A1* | 5/2015 | Benz | F02C 3/34 60/39.52 |
| 2016/0186659 A1* | 6/2016 | Nagao | F02C 7/20 60/39.182 |
| 2017/0138258 A1* | 5/2017 | Yoshida | F01K 23/067 |

\* cited by examiner

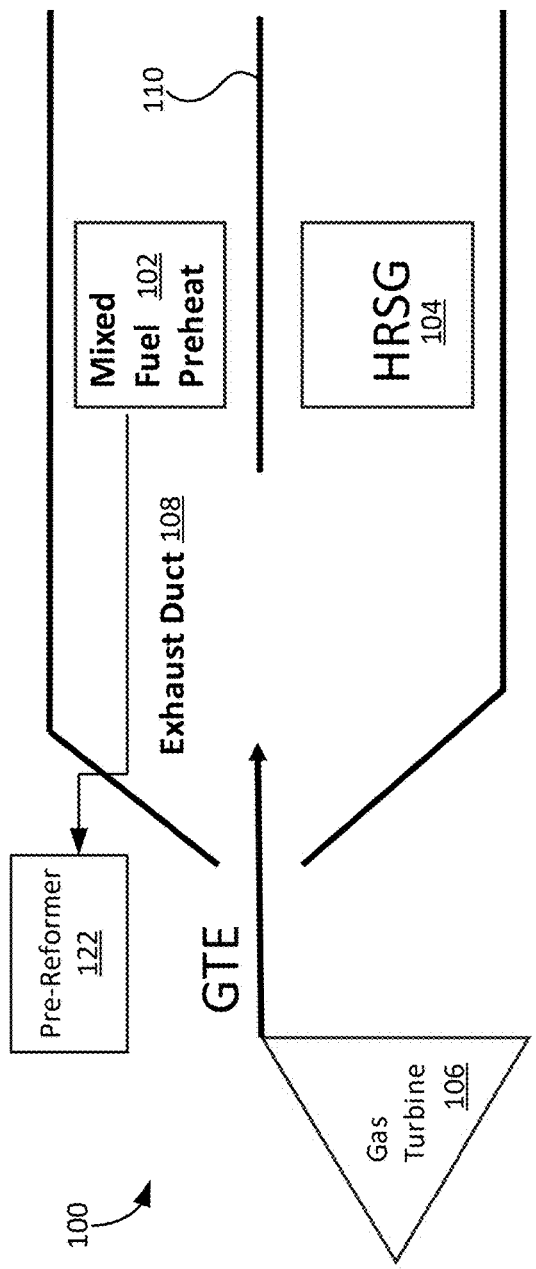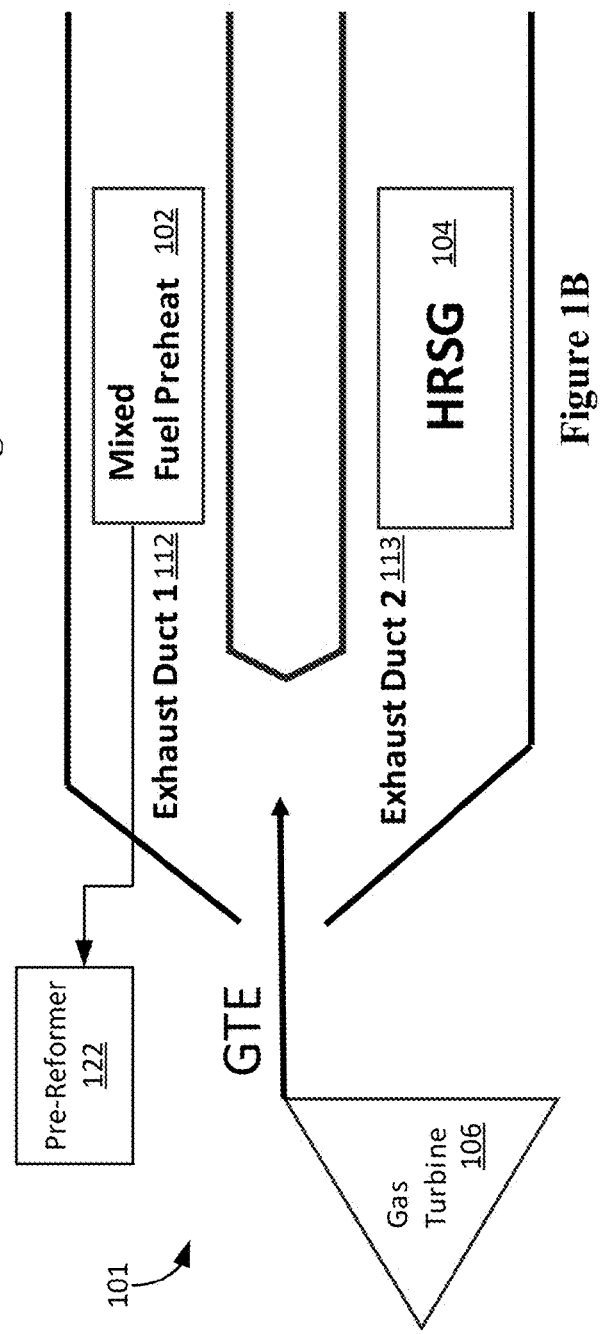

PARALLEL HEAT RECOVERY IN GAS POWER GENERATION

BACKGROUND

According to the United States Department of Energy, natural gas accounts for 43.1% of utility-scale electricity generation, which equates to almost two trillion kilowatt-hours. Natural gas also represents the largest energy source for utility-scale electricity generation in the United States. Much of this electricity is generated in combined-cycle power plants that utilize a gas turbine and a steam cycle to generate power. Typical efficiency of combined-cycle plants approximates 60%. Even small improvements in overall efficiency of combined-cycle electricity generation can result in huge savings in overall cost of generating the electricity, as well as huge savings in the environmental impacts from generating the electricity.

BRIEF SUMMARY

Systems and methods for generating electrical power by use of a gas turbine that generates shaft power suitable to turn an electric generator and gas turbine exhaust (GTE) in a parallel stream are disclosed herein. The GTE is fed to a heat recovery steam generator (HRSG) and a mixed fuel preheat coil operating in parallel. The HRSG generates superheated steam suitable for a multi-stage steam turbine to produce additional shaft power for electrical generation. The mixed fuel preheat coil heats up a mixture of steam and fuel, which is fed to an external pre-reformer to generate reformed fuel for the gas turbine. Cooling may be provided by a reformed fuel cooler for the reformed fuel stream to adjust the temperature, as necessary, before feeding it as fuel to the gas turbine. Advantageously, by splitting the GTE from the gas turbine into both the mixed fuel preheat coil and the HRSG in parallel, the overall efficiency of the modified combined-cycle power system is improved.

In some cases, the system further includes a GTE flow controller coupled to the parallel connection to control the ratio of the GTE received by the mixed fuel preheat coil and the HRSG. The parallel heat recovery connection from the gas turbine to the mixed fuel preheat coil and the HRSG may be carried out in a single exhaust duct having an internal separator baffle or it may be accomplished in separate (e.g., dual) exhaust ducts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A and 1B illustrate a parallel heat recovery system.

DETAILED DESCRIPTION

Figure 2A:
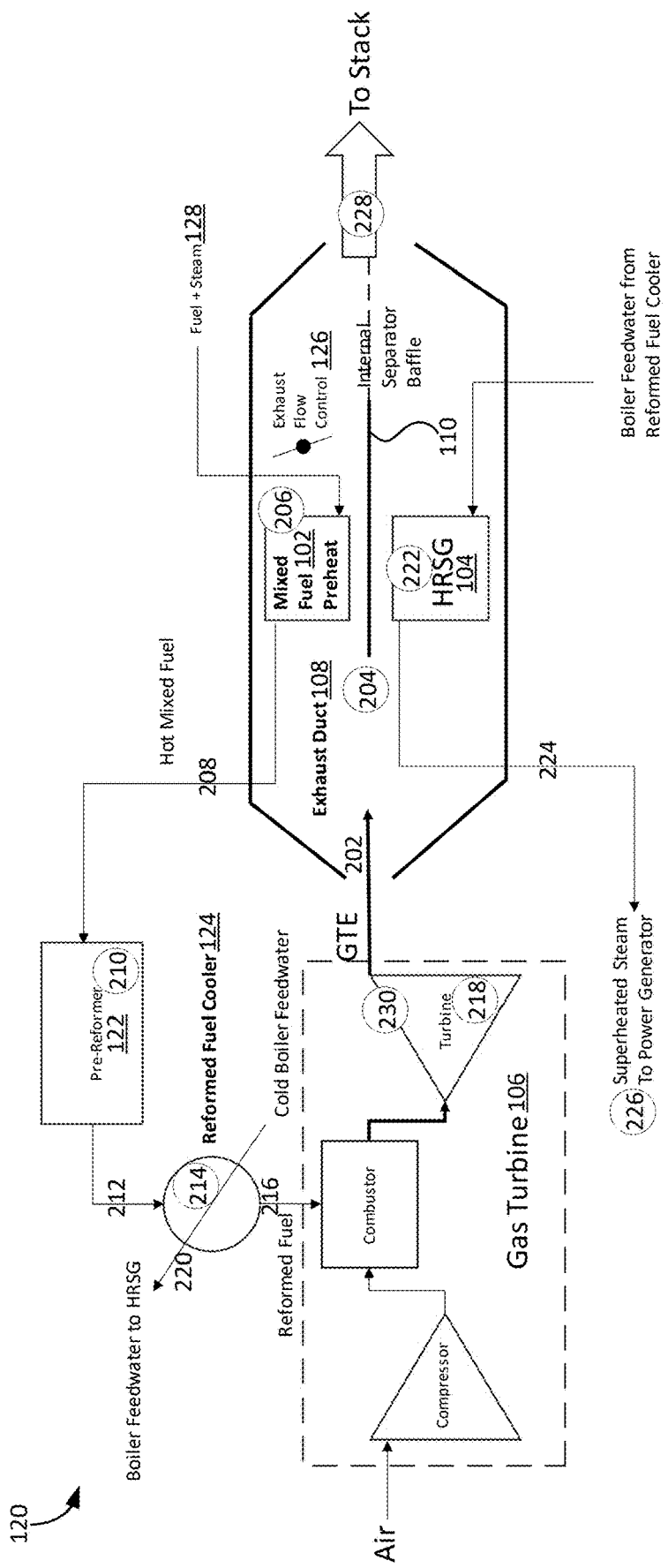
FIGS. 2A and 2B illustrate a modified combined-cycle gas power generation system.

Systems and methods for generating electrical power by use of a gas turbine that generates shaft power suitable to turn an electric generator and gas turbine exhaust (GTE) in a parallel stream are disclosed herein. The GTE is subsequently fed to a heat recovery steam generator (HRSG) and a mixed fuel preheat coil operating in parallel. The HRSG generates superheated steam suitable for a multi-stage steam turbine to produce additional shaft power for electrical generation. The mixed fuel preheat coil heats up a mixture of steam and fuel, which is fed to an external pre-reformer to generate reformed fuel for the gas turbine. Cooling may be provided by a reformed fuel cooler for the reformed fuel stream to adjust the temperature, as necessary, before feeding it as fuel to the gas turbine. Advantageously, by splitting the GTE from the gas turbine into both the mixed fuel preheat coil and the HRSG in parallel, and the use of an external pre-reformer for the mixed fuel, the overall efficiency of the modified combined-cycle gas power system is improved.

Previous systems have described using GTE in both a mixed fuel preheat coil and an HRSG in series. Indeed, these systems have been proposed for natural gas electricity generation systems, yet these systems suffer from a loss in efficiency; by having the mixed fuel preheat coil and the HRSG in series, one or the other of these components necessarily uses GTE that is not as hot (e.g., due to the GTE first being used in the other component, which lowers the temperature of the GTE) as the GTE would be if it were directly supplied from the gas turbine. Indeed, when the mixed fuel preheat coil is second in series to the HRSG, the mixed fuel preheat coil cannot heat the mixed fuel sufficiently for efficient use in the pre-reformer. On the other hand, when the HRSG is second in series to the mixed fuel preheat coil, the superheated steam that is generated in the HRSG is not as hot, which lowers the efficiency of the steam turbine downstream of the HRSG. The inventor has surprisingly discovered that directly sending GTE from the gas turbine to 1) the mixed fuel preheat coil followed by a pre-reformer and 2) the HRSG (e.g., simultaneously via a parallel connection) leads to an overall efficiency improvement to the modified combined-cycle gas power system. This means that modified combined-cycle systems can use less fuel to generate the same amount of electricity and/or generate more electricity from the same amount of fuel. Additionally, because the disclosed system and methods include an external pre-reformer that is separate from the mixed fuel preheat coil, when the catalyst in the external pre-reformer is spent, the external pre-reformer can be bypassed while the catalyst is changed out or the catalyst can be changed out during a maintenance turn-around, which significantly reduces downtime. In addition to this advantage, the use of an external pre-reformer simplifies upgrading existing units to improve their efficiency as most of the retrofitting can be done while the unit is in operation.

The term "fuel" refers to natural gas, kerosene, and/or biofuel.

FIGS. 1A and 1B illustrate a parallel heat recovery system. Referring to FIGS. 1A and 1B, a parallel heat recovery system 100/101 includes a mixed fuel preheat coil 102 and a parallel connection for receiving gas turbine exhaust (GTE) from a downstream end of a gas turbine 106, the parallel connection coupling a gas turbine 106 to the mixed fuel preheat coil 102 and an HRSG 104. In some cases, the parallel heat recovery system 100/101 further includes the gas turbine 106.

Referring to FIG. 1A, the parallel connection from the gas turbine 106 to the mixed fuel preheat coil 102 and the HRSG 104 is a single exhaust duct 108 having an internal separator baffle 110. Referring to FIG. 1B, the parallel connection from the gas turbine 106 to the mixed fuel preheat coil 102 and the HRSG 104 is dual exhaust ducts 112/113.

The parallel connection (e.g., single exhaust duct 108 having an internal separator baffle 110) can be made of one or more materials (e.g., a metal alloy or ceramic material) that are capable of withstanding extreme temperatures (e.g., greater than 1000° F.) over an extended period of time without significant deformation (e.g., warping and/or sagging). In some cases, the parallel connection is a single exhaust duct that begins at the gas turbine 106 and includes 1) a first connection to the mixed fuel preheat coil 102 and 2) a second connection to the HRSG 104, with each of those connections (e.g., openings) being in parallel and sized to permit a specific amount and/or range of the GTE to pass through to the mixed fuel preheat coil 102/HRSG 104 (e.g., based on the size of the gas turbine 106 and the amount of GTE needed for the mixed fuel preheat coil 102/HRSG 104 to perform their respective functions). In some cases, the connections may include a valve, such as GTE flow control vanes, to further control the specific amount and/or range of the GTE passing through to the mixed fuel preheat coil 102/HRSG 104. In some cases, after the GTE is used in the mixed fuel preheat coil 102 and/or HRSG 104, the GTE is sent (e.g., separately and/or in a re-combined duct) to a stack for disbursement into the atmosphere.

Figure 2B:
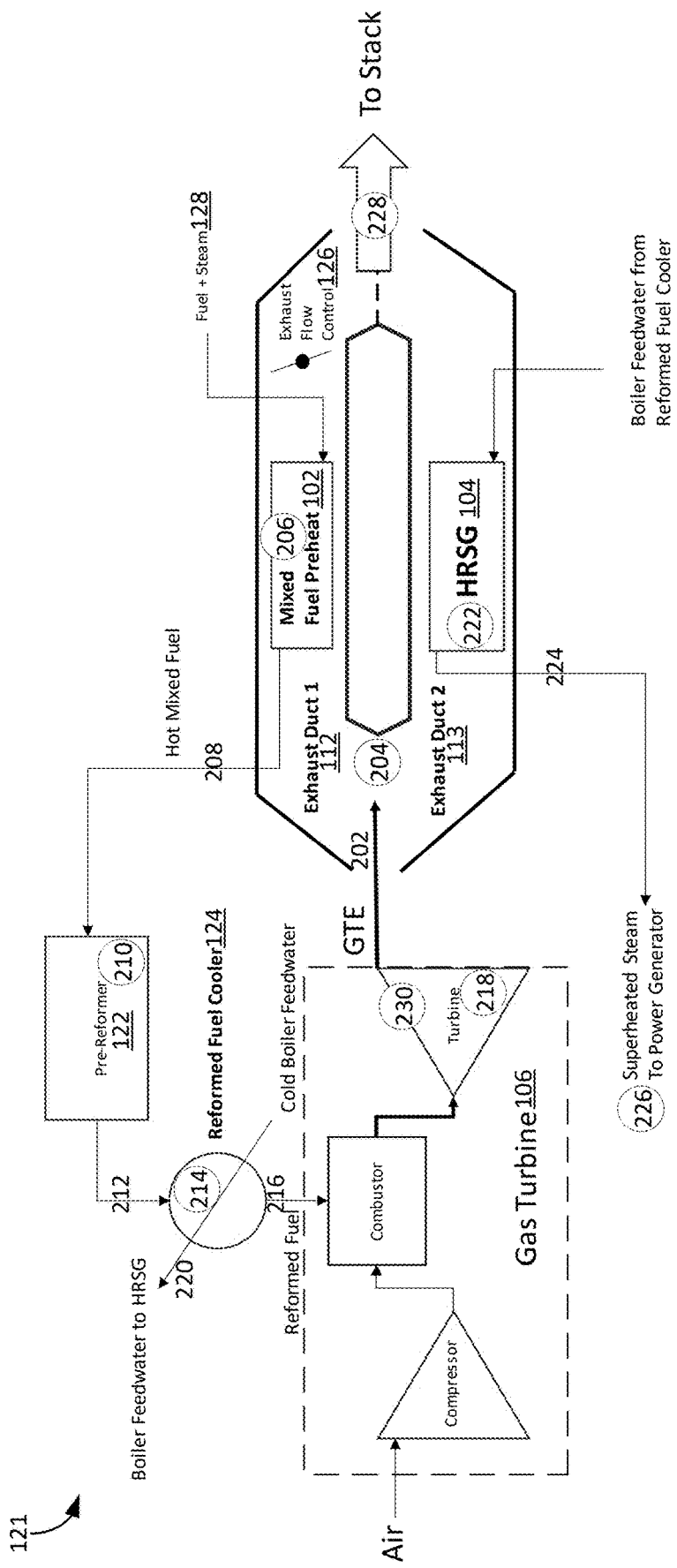

FIGS. 2A and 2B illustrate a modified combined-cycle gas power generation system. Referring to FIGS. 2A and 2B, a modified combined-cycle gas power generation system 120/121 includes a parallel heat recovery system 100/101 (e.g., as described with respect to FIGS. 1A and 1B), including the mixed fuel preheat coil 102, a heat recovery steam generator (HRSG) 104, and a parallel connection (e.g., coupling a gas turbine 106 to the mixed fuel preheat coil 102 and the HRSG 104) for receiving gas turbine exhaust (GTE). FIG. 2A illustrates a parallel connection that is single exhaust duct 108 having an internal separator baffle 110 (e.g., as described with respect to FIG. 1A). FIG. 2B illustrates a parallel connection that is dual exhaust ducts 112/113 (e.g., as described with respect to FIG. 1B).

Referring to FIGS. 2A and 2B, the modified combined-cycle gas power generation system 120/121 can further include an external pre-reformer 122 coupled to a downstream end of the mixed fuel preheat coil 102. The external pre-reformer 122 includes (e.g., is packed with) a catalyst for converting hot mixed fuel to reformed fuel in an overall endothermic set of reactions, a reformed fuel cooler 124 coupled to a downstream end of the external pre-reformer 122 to cool the reformed fuel to a lower temperature for use as fuel in a gas turbine 106, and the gas turbine 106 coupled to a downstream end of the reformed fuel cooler 124.

In some cases, the mixed fuel preheat coil 102 does not include a burner. In some cases, the mixed fuel preheat coil 102 is configured to not include catalyst for generating reformed fuel. In some cases, the parallel connection (e.g., single exhaust duct 108 having an internal separator baffle 110 or dual exhaust ducts 112/113) does not include a burner. In some cases, the parallel connection is configured to not include catalyst for generating reformed fuel. In some cases, the external pre-reformer 122 is pre-packed with catalyst for generating reformed fuel in a set of overall endothermic reactions with hot mixed fuel from the mixed fuel preheat coil 102. It should be understood that the external pre-reformer 122 is separate from the mixed fuel preheat coil 102 (e.g., housed in a different vessel) and coupled to the mixed fuel preheat coil 102 via a pipe or other similar connection that is normally used to move hot mixed fuel. As explained above, by having an external pre-reformer 122 (e.g., a pre-reformer that is separate and/or detached and/or not within the mixed fuel preheat coil 102), when catalyst replacement is needed to continue generation of reformed fuel, the external pre-reformer can be bypassed while the catalyst is changed out or the catalyst can be changed out during a maintenance turn-around, which significantly reduces downtime. In some cases, the external pre-reformer is an external steam methane pre-reformer, an external steam kerosene pre-reformer, and/or a steam biofuel pre-reformer.

In some cases, the modified combined-cycle gas power generation system 120/121 further includes a GTE flow controller 126 coupled to the parallel connection to control a ratio of the GTE received by the mixed fuel preheat coil 102 and the HRSG 104. In some cases, the mixed fuel preheat coil 102 is coupled to a fuel and steam source 128 for receiving fuel and steam that is heated using the GTE in the mixed fuel preheat coil 102 to create a hot mixed fuel. In some cases, the steam portion of the fuel and steam is generated and/or supplied from the HRSG 104.

A method of using a modified combined-cycle gas power system includes receiving (202), directly from the gas turbine 106 via the parallel connection, gas turbine exhaust (GTE) at the mixed fuel preheat coil 102 and the HRSG 104 simultaneously, raising (206) a temperature of fuel and steam using the GTE in the mixed fuel preheat coil to create a hot mixed fuel, feeding (208) the hot mixed fuel from the mixed fuel preheat coil to the external pre-reformer, and producing (210) reformed fuel in the external pre-reformer for use in the gas turbine as fuel through a set of endothermic reactions between the hot mixed fuel and a catalyst included (e.g., packed in) the external pre-reformer 122.

In some cases, the method further includes controlling (204), by the GTE flow controller 126, a ratio of the GTE received by the mixed fuel preheat coil 102 and the HRSG 104. In some cases, the method further includes moving (212) the reformed fuel from the external pre-reformer 122 to the reformed fuel cooler 124 and reducing (214) the temperature of the reformed fuel using boiler feedwater in the reformed fuel cooler 124. In some cases, the method further includes moving (216) the temperature-reduced reformed fuel to the gas turbine 106, generating (218) shaft power for electricity generation using the temperature-reduced reformed fuel in the gas turbine 106, and feeding (220) the boiler feedwater from the reformed fuel cooler 124 to the HRSG 104. In some cases, the method further includes heating (222) the boiler feedwater using the GTE in the HRSG 104 to create superheated steam, feeding (224) the superheated steam to the steam turbine, and thus generating (226) shaft power that can be used for generating additional electricity. In some cases, the method further includes moving (228) (e.g., separately and/or in a re-combined duct) the GTE from the mixed fuel preheat coil 102 and the HRSG 104 to a stack for disbursement into the atmosphere. In some cases, the method further includes producing (230) GTE in the gas turbine 106 when generating the fuel-powered electricity.

In any case, using the method described herein, an overall efficiency improvement to the modified combined-cycle gas power generation system 120/121 is realized by directly sending GTE from the gas turbine 106 to the mixed fuel preheat coil 102 and the HRSG 104 (e.g., simultaneously via a parallel connection).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A modified combined-cycle gas power system comprising:
a mixed fuel preheat coil;
a heat recovery steam generator (HRSG);
a parallel connection for receiving gas turbine exhaust (GTE) from a downstream end of a gas turbine, the parallel connection coupling the gas turbine to the mixed fuel preheat coil and the HRSG and simultaneously sending a portion of the GTE to the mixed fuel preheat coil and a remaining portion of the GTE to the HRSG, wherein the portion of the GTE sent to the mixed fuel preheat coil is sent directly to a stack upon exiting the mixed fuel preheat coil; and
an external pre-reformer coupled to the downstream end of the mixed fuel preheat coil.

2. The system of claim 1, further comprising a GTE flow controller coupled to the parallel connection to control a ratio of the GTE received by the mixed fuel preheat coil and the HRSG.

3. The system of claim 1, wherein the parallel connection from the gas turbine to the mixed fuel preheat coil and the HRSG is a single exhaust duct having an internal separator baffle.

4. The system of claim 1, wherein the parallel connection from the gas turbine to the mixed fuel preheat coil and the HRSG is dual exhaust ducts.

5. The system of claim 1, wherein the mixed fuel preheat coil is coupled to a fuel and steam source for receiving fuel and steam that is heated using the GTE in the mixed fuel preheat coil to create a hot mixed fuel.

6. The system of claim 5, wherein the external pre-reformer generates reformed fuel, wherein the external pre-reformer receives the hot mixed fuel from the mixed fuel preheat coil.

7. The system of claim 6, further comprising a reformed fuel cooler coupled to a downstream end of the external pre-reformer, wherein the reformed fuel cooler reduces the temperature of the reformed fuel from the external pre-reformer using boiler feedwater.

8. The system of claim 7, wherein the HRSG is coupled to the reformed fuel cooler to receive the boiler feedwater after the boiler feedwater is used to reduce the temperature of the reformed fuel.

9. The system of claim 8, wherein the HRSG is configured to heat the boiler feedwater with the GTE to create superheated steam for use in a steam power generator.

10. The system of claim 7, further comprising the gas turbine to produce shaft power to power an electric generator using the temperature-reduced reformed fuel from the reformed fuel cooler, wherein the gas turbine is coupled to a downstream end of the reformed fuel cooler.

11. The system of claim 1, wherein the mixed fuel preheat coil does not include a burner.

12. The system of claim 11, wherein the mixed fuel preheat coil is configured to not include internal catalyst for generating reformed fuel.

13. A method of using a modified combined-cycle gas power system, including a mixed fuel preheat coil, a heat recovery steam generator (HRSG), a parallel connection coupling a gas turbine to the mixed fuel preheat coil and the HRSG, and an external pre-reformer coupled to a downstream end of the mixed fuel preheat coil, the method comprising:

simultaneously receiving, directly from the gas turbine via the parallel connection, a portion of gas turbine exhaust (GTE) at the mixed fuel preheat coil and a remaining portion of the GTE at the HRSG;
raising a temperature of fuel and steam using the GTE in the mixed fuel preheat coil to create a hot mixed fuel;
sending the portion of the GTE received at the mixed fuel preheat coil directly to a stack upon exiting the mixed fuel preheat coil;
feeding the hot mixed fuel from the mixed fuel preheat coil to the external pre-reformer; and
producing reformed fuel in the external pre-reformer for use in the gas turbine as fuel.

14. The method of claim 13, wherein the modified combined-cycle gas power system further includes a GTE flow controller coupled to the parallel connection, the method further comprising controlling a ratio of the GTE received by the mixed fuel preheat coil and the HRSG.

15. The method of claim 14, wherein the modified combined-cycle gas power system further comprises a reformed fuel cooler coupled to the external pre-reformer, wherein the method further comprises:
moving the reformed fuel from the external pre-reformer to the reformed fuel cooler; and
reducing the temperature of the reformed fuel using boiler feedwater in the reformed fuel cooler.

16. The method of claim 15, wherein the modified combined-cycle gas power system further comprises the gas turbine coupled to the reformed fuel cooler; and a steam turbine, the method further comprising:
moving the temperature-reduced reformed fuel to the gas turbine;
generating shaft power for electricity generation using the temperature-reduced reformed fuel in the gas turbine;
feeding the boiler feedwater from the reformed fuel cooler to the HRSG;
heating the boiler feedwater using the GTE in the HRSG to create superheated steam;
feeding the superheated steam to a steam turbine; and
generating shaft power to generate electricity in the steam turbine.

17. A system comprising:
a mixed fuel preheat coil, wherein the mixed fuel preheat coil does not include a burner; and
a parallel connection for receiving gas turbine exhaust (GTE) from a downstream end of a gas turbine, the parallel connection coupling the gas turbine to the mixed fuel preheat coil and a heat recovery steam generator (HRSG) and simultaneously sending a portion of the GTE to the mixed fuel preheat coil and a remaining portion of the GTE to the HRSG, wherein the portion of the GTE sent to the mixed fuel preheat coil is sent directly to a stack upon exiting the mixed fuel preheat coil, wherein the parallel connection does not include a burner.

18. The system of claim 17, wherein the parallel connection is configured to not include catalyst for reforming fuel.

19. The system of claim 18, wherein the mixed fuel preheat coil is configured to not include catalyst for generating reformed fuel.

20. The system of claim 19, further comprising an external pre-reformer coupled to the downstream end of mixed fuel preheat coil.

* * * * *